United States Patent [19]

Chiavaroli

[11] Patent Number: 4,467,773

[45] Date of Patent: Aug. 28, 1984

[54] FUEL SUPPLY SYSTEM WITH IMPROVED THROTTLE BODY HEATER

[75] Inventor: Donald J. Chiavaroli, Norton, Mass.

[73] Assignee: Texas Instruments Incorporated, Dallas, Tex.

[21] Appl. No.: 517,493

[22] Filed: Jul. 26, 1983

[51] Int. Cl.³ .......................................... F02M 31/00
[52] U.S. Cl. .................................. 123/549; 123/545; 123/546; 219/207; 261/142
[58] Field of Search .................... 219/205, 206, 207; 123/549, 545, 546, 547; 261/142, 144, 145

[56] References Cited

U.S. PATENT DOCUMENTS

| | | | |
|---|---|---|---|
| 1,632,139 | 6/1927 | Marroux | 123/557 |
| 4,361,125 | 11/1982 | Igashira | 219/206 |
| 4,366,798 | 1/1983 | Goto | 123/545 |
| 4,377,148 | 3/1983 | Ishida | 123/545 |
| 4,389,354 | 6/1983 | Endou | 261/142 |
| 4,390,000 | 6/1983 | Igashira | 261/142 |

*Primary Examiner*—Ronald H. Lazarus
*Attorney, Agent, or Firm*—James P. McAndrews; John A. Haug; Melvin Sharp

[57] ABSTRACT

A fuel supply system for an internal combustion engine has an electrical resistance heater accommodated in a chamber in gasket means which space a throttle body flange from a mating flange on an intake manifold of the engine for transferring heat to the throttle body flange to avoid freeze up in the throttle body during furnishing of an air-fuel mixture to the engine.

15 Claims, 2 Drawing Figures

FUEL SUPPLY SYSTEM WITH IMPROVED THROTTLE BODY HEATER

BACKGROUND OF THE INVENTION

The field of this invention is that of fuel supply systems for internal combustion engines and the invention relates more particularly to a fuel supply system having electrical heater means arranged to prevent freeze-up of throttle body means or the like in the system, particularly as fuel is evaporated in the system to be furnished to the engine in an air-fuel mixture.

When air or an air-fuel mixture is furnished to an internal combustion engine through throttle body means in a carbureted fuel supply system, in a throttle body injection system, or in a direct port fuel injection system or the like where the throttle body controls the amount of air available to the engine or the like, there is a tendency for some components of the system, particularly components such as the throttle bearings or the like of the throttle body means, to freeze-up and operate poorly or to fail to operate under some atmospheric or driving conditions. Such freeze-up tends to occur particularly as operation of an internal combustion engine is initiated. It would be desirable if heat could be provided to the fuel system as soon as engine operation is initiated to counteract this tendency of freeze-up to occur in the throttle body means.

SUMMARY OF THE INVENTION

It is an object of the invention to provide a novel and improved fuel supply system having means for avoiding freeze-up of throttle body means in the system; to provide such a system having gasket means accommodating electrical resistance heater means therein to be located between mounting flange means on the throttle body means and mating flange means on the engine for transferring heat to the throttle body means through the flange means; to provide a novel and improved gasket heater means for use in such a system; and to provide such a novel and improved fuel supply system and gasket heater means which is a rugged, reliable and economical construction.

Briefly described, the novel and improved fuel supply system of this invention comprises throttle body means having passage means therein open at one end for communicating with a corresponding opening in an intake manifold of the engine for furnishing air or an air-fuel mixture to the engine. The throttle body means can comprise a section of a carburetor, or a throttle body of a throttle body fuel injection system, or a throttle body or housing or the like of a direct port fuel injection system within the scope of this invention. The throttle body means has flange means which are disposed around the open end of the throttle body passage means to mate to corresponding flange means provided on the intake manifold of the engine around the intake manifold opening. Preferably the flange means serve for mounting the throttle body means on the engine. Gasket means are provided between the throttle body flange means and the mating engine flange means and, in accordance with this invention, a chamber is provided in the gasket means at a location between portions of the two noted flange means. The gasket means provide selected spacing between the flanges and have compressible sealing means at respective opposite sides of the gasket means for sealingly engaging the respective throttle body flange means and mating engine flange means for sealing communication between the throttle body passage and the intake manifold opening. An electrical resistance heater means is accommodated in the chamber between portions of the throttle body flange and the mating engine flange to be energized therein, preferably on initiation of engine operation, for transferring heat to the throttle body flange means to avoid freeze-up of a throttle body means.

In a preferred embodiment of the invention, an aperture is provided in the gasket means communicating with one side of the chamber. A cup-shaped metal heat-transfer element having a bottom, a side wall and a rim and having a flange on the rim is located within the chamber so that the bottom of the element is adapted to move to extend out of the chamber through the aperture to engage the throttle body flange means. A self-regulating electrical resistance heater element of a material of positive temperature coefficient of resistivity has one side thereof bonded in thermally and electrically conductive relation to the bottom of the cup-shaped heat-transfer element inside the element; a metal terminal means is disposed on the gasket means at an opposite side of the chamber; and spring means are disposed between the terminal means and the opposite side of the heater unit for electrically connecting the heater unit to the terminal means and for biasing the heat-transfer element into engagement with the throttle body flange means for electrically grounding the heater unit to the throttle body means and connecting the electrical heater means in an energizing electrical circuit.

DESCRIPTION OF THE DRAWINGS

Other objects, advantages and details of the novel and improved fuel supply system and gasket heater means of this invention appear in the following detailed description of preferred embodiments of the invention, the detailed description referring to the drawings in which.

DESCRIPTION OF THE PREFERRED EMBODIMENTS

Figure 1:
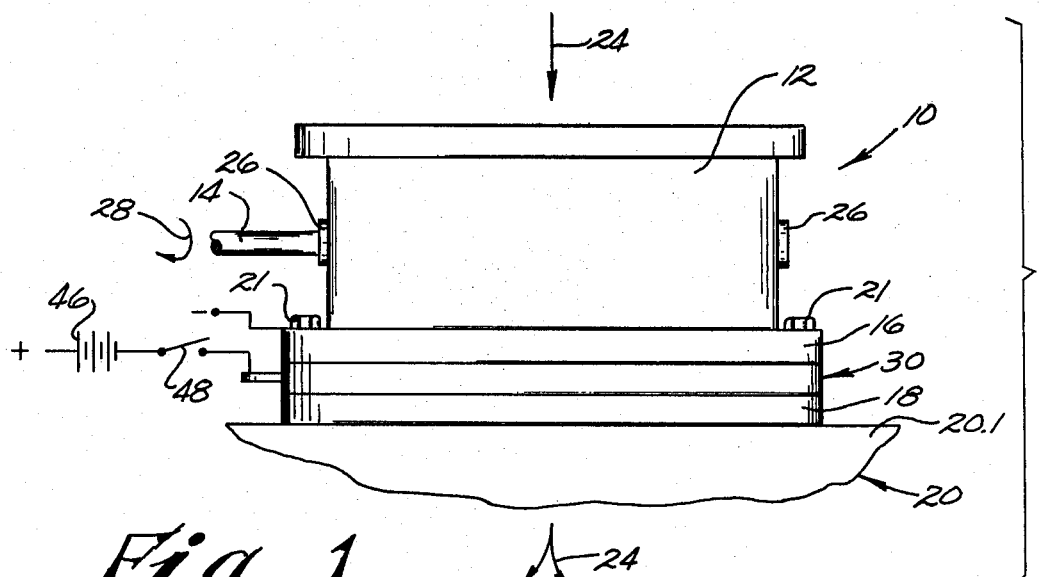
FIG. 1 is a partial side elevation view of a fuel supply system of this invention.
Figure 2:
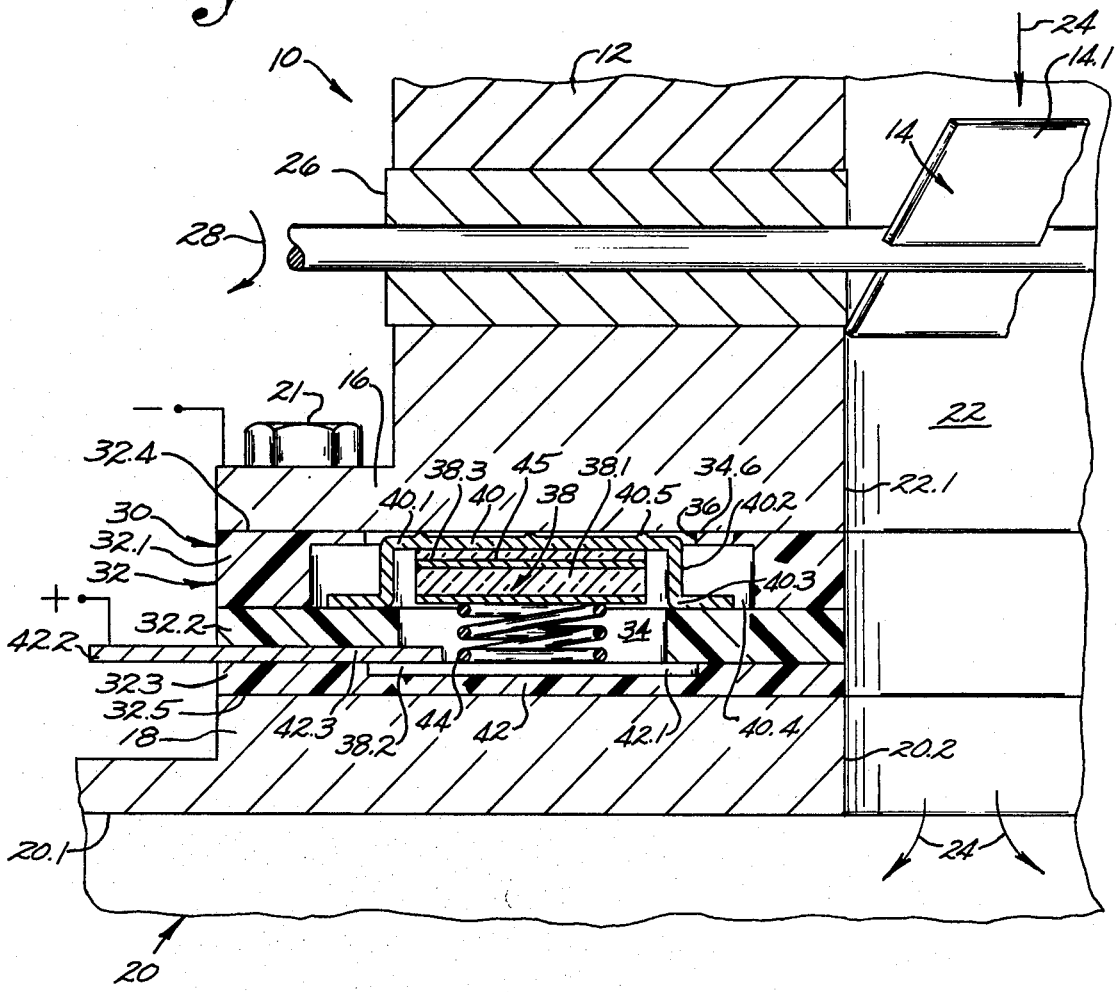
FIG. 2 is a partial section view to enlarged scale along the vertical axis of the system of FIG. 1.

Referring to the drawings, 10 in FIGS. 1 and 2 indicates the novel and improved fuel supply system of this invention which is shown to include a throttle body 12 having throttle body components such as the throttle valve 14 mounted therein. The throttle body means 12 has throttle body flange means 16 arranged to mate with corresponding flange means 18 on the intake manifold 20.1 of an internal combustion engine diagrammatically illustrated at 20 in FIGS. 1 and 2. Preferably the flange means 16 and 18 serve for mounting the throttle body means on the engine as is diagrammatically illustrated in FIGS. 1 and 2 by the bolt means 21. The throttle body means 12 has passage means 22 therein which open at one end 22.1 for communicating with a corresponding opening 20.2 in the intake manifold for furnishing air or a mixture of air and fuel to the engine in conventional manner as is diagrammatically illustrated by the arrows 24 in FIGS. 1 and 2. Typically the throttle valve 14 is rotatably movable in bearings 26 in the throttle body means as is diagrammatically indicated by arrows 28 in FIGS. 1 and 2 so that the throttle valve blade 14.1 regulates the flow of air or air-fuel mixture 24 to the engine in the throttle body passage 22. In such a throttle body arrangement, it will be understood that there is a tendency for the throttle body bearings to freeze-up when air or an air-fuel mixture is furnished to the engine through the throttle body passage 22. This is particularly true when fuel is evaporating in the passage during engine start-up on the occurrence of selected atmospheric conditions or the like.

In accordance with this invention, novel and improved gasket heater means 30 are arranged between the throttle body flange means 16 and the mating flange means 18 on the engine for sealing communication between the passage 22 and the intake manifold opening 20.2 and for transferring heat to the throttle body means 12 for preventing freeze-up of throttle body components during furnishing of air or an air-fuel mixture to the engine 20. In a preferred embodiment of this invention, for example, the novel and improved gasket means 30 comprises a compressible gasket means 32 of a material such as a phenolic resin or the like, preferably having multiple layers 32.1, 32.2 and 32.3 or the like secured together by adhesive means (not shown) or by fusing or the like. The gasket means are adapted to provide a selected spacing between the flanges 16 and 18 when the bolts 21 are drawn down to apply selected pressure on the gasket means and opposite sides 32.4, 32.5 of the compressible gasket material are adapted to sealingly engage the respective flanges 16 and 18. Chamber means 34 are provided in the gasket means at a location within the gasket means such that when the gasket means 30 is arranged between the flanges 16 and 18 at least part of the chamber means is disposed between the mating flanges 16 and 18. Typically for example, a pair of the chambers 34 (only one of which is shown in FIG. 2) are provided in the gasket means at locations beneath the throttle body flange means 16 aligned with the respective locations of the bearings 26 in the throttle body for a purpose to be described below. Preferably as shown in FIG. 2, the gasket means has an aperture 36 communicating with each chamber 34 at the side of the chamber adjacent to the throttle body flange means 16.

In accordance with this invention and electrical resistance heater 38 is accommodated within the gasket chamber means 34 to be energized therein for transferring heat to the throttle body means 12 as described below. Preferably for example, a metal heat-transfer means 40 is arranged at one side of the heater means for facilitating heat-transfer to the throttle body flange 16. Preferably also, metal terminal means 42 are arranged in the gasket means at an opposite side of the heater means 50 and conductive metal spring means 44 are disposed between the terminal means and the heater means for electrically connecting the terminal means to the heater means. Preferably the terminal means 42 comprises a support portion 42.1 embedded in the gasket means and a terminal post portion 42.2 which extends from the gasket means through a slot 42.3 in the gasket means.

In a preferred embodiment of the invention, the metal heat-transfer means 40 comprises a cup-shaped metal element having a bottom 40.1, a side wall 40.2, a rim 40.3, and a flange 40.4 extending around the rim. Projections 40.5 are preferably provided on the outer side of the bottom of the element. The heater means 38 preferably comprises a self-regulating electrical resistance heater unit having a body 38.1 of a ceramic material or the like such as lanthanum-doped barium titanate of positive temperature coefficient of resistivity having metal contact layers 38.2 and 38.3 formed on opposite sides thereof. Preferably the heater body material is selected to display a sharp anomalous increase in resistivity when electrically energized for stabilizing at a safe element temperature after energization. The contact layer 38.3 on one side of the heater unit is bonded in thermally and electrically conductive relation to the heat-transfer cup by use of an electrically conductive, metal-filled epoxy adhesive 45 or the like. The spring means 44 typically comprises a coil spring means as shown or a corresponding cantilever or bifurcated leaf spring or the like which is disposed between the terminal means and the opposite contact layer 38.2 of the heater unit for electrically connecting the heater unit to the terminal means and for biasing the heat-transfer cup to extend from the aperture 36. The heat-transfer cup is arranged to be movable in the chamber 34 to extend its bottom through the aperture 36 to electrically engage the throttle body flange means 16 as shown in FIG. 2. The flange 40.4 of the heat-transfer cup is arranged to engage a portion 34.6 of the gasket layer 34.1 for limiting extension of the heat-transfer cup from the aperture 36.

In that arrangement, the terminal post 42.2 of the gasket heater means 30 is adapted to be electrically connected to an automotive power source such as the battery 46 through switch means or the like such as the ignition switch 48 and the throttle body means 12 is connected to electrical ground for connecting the heater unit 38 in an electrical circuit as is diagrammatically illustrated in FIG. 1. The heater unit 38 is connected in the electrical circuit between the terminal means 42 and the throttle body flange 16. Accordingly, the heater unit is promptly energized when the ignition switch 48 is closed for promptly generating heat and transferring that heat to the throttle body flange means 12 in an efficient manner. In that way the throttle body means receives heat for preventing freeze-up of throttle body components such as the throttle bearings 26. The heater unit is self-regulating so that it stabilizes at a safe temperature for continuing its desired throttle body heating effect. The gasket means 30 is easily and economically manufactured and is easily and compactly accommodated in the fuel supply system 10 in conventional manner.

It should be understood that although particular embodiments of the invention have been described by way of illustrating the invention, this invention includes all modifications and equivalents of the disclosed embodiments falling within the scope of the appended claims.

I claim:

1. A fuel supply system for an internal combustion engine comprising throttle body means having passage means open at one end for communicating with a corresponding opening in an intake manifold of the engine to furnish at least the air component of an air-fuel mixture to the engine, the throttle body means having flange means disposed around the open end of the passage means, and gasket means arranged between the throttle body flange means and mating flange means disposed on the engine around the opening in the intake manifold for sealing communication between the passage means and the engine, characterized in that the gasket means provides selected spacing between said flanges and provides compressible sealing means at respective opposite sides of the gasket means to sealingly engage the throttle body flange means and the mating engine flange means, a chamber is provided in the gasket means at a location between portions of the throttle body flange means and said engine flange means, the chamber having an aperture adjacent to the throttle body flange and electrical resistance heater means are accommodated in the chamber between portions of the throttle body flange means and said engine flange means to engage the throttle body flange means through said aperture and to be energized therein for transferring heat to the throttle body flange means to avoid freeze-up of the throttle body means during furnishing of said component of said air-fuel mixture to the engine.

2. A fuel supply system as set forth in claim 1 further characterized in that metal heat-transfer means are disposed at one side of the heater means between the heater means and the throttle body flange means for facilitating heat-transfer from the electrical resistance heater means to the throttle body flange means.

3. A fuel supply system as set forth in claim 2 further characterized in that electrically conductive terminal means extend into the gasket means at an opposite side of the heater means, the electrical resistance heater means is mounted in said chamber between the terminal means and the heat-transfer means, and spring means resiliently engage the heater means and terminal means for electrically connecting the heater means in an electrical circuit.

4. A fuel supply system as set forth in claim 3 further characterized in that the electrical resistance heater means comprises a self-regulating electrical resistance heater unit of positive temperature coefficient of resistivity having one side thereof bonded in thermally and electrically conductive relation to the metal heat-transfer means to faciliate heat transfer to the throttle body flange means, the spring means electrically connecting an opposite side of the heater unit to the metal terminal means.

5. A fuel supply system as set forth in claim 4 further characterized in that the metal heat-transfer means electrically engages the throttle body means for electrically grounding the heater unit to the throttle body means for connecting the heater unit in an electrical circuit between the terminal means and the throttle body means.

6. A fuel supply system as set forth in claim 5 further characterized in that the gasket means has an aperture therein communicating with said chamber and said spring means bias the metal heat-transfer means to extend through said aperture to engage the throttle body means for facilitating heat-transfer to the throttle body means and electrically connecting the heater unit to the throttle body means.

7. A fuel supply system as set forth in claim 6 further characterized in that the metal heat-transfer means comprises a cup-shaped metal element having a bottom, a side wall, a rim, and a flange extending outwardly from said rim, the heater unit is bonded to the bottom of the cup-shaped element inside the element, the cup-shaped element is slidable in said aperture, the spring means biases the cup-shaped element to move an outer side of the bottom of the cup-shaped element to extend through said aperture to engage the throttle body flange means, and the rim of said element is adapted to engage a portion of said gasket means for limiting extension of the cup-shaped element from the aperture.

8. A fuel supply system as set forth in claim 7 further characterized in that projections on the outer side of the bottom of the cup-shaped element facilitates electrical connection of the element to the throttle body flange means.

9. Gasket heater means to be disposed between flange means on a throttle body means and mating flange means on an intake manifold of an internal combustion engine for sealing communication between passage means in the throttle body means and a corresponding opening in the intake manifold for furnishing at least an air component of an air-fuel mixture to the engine comprising gasket means to be disposed between the throttle body flange means and said mating flange means for providing selected spacing therebetween, the gasket means having compressible sealing means on respective opposite sides thereof for sealingly engaging the throttle-body flange means and said mating flange means and having a chamber therein at a location to be disposed between portions of the throttle body flange means and the mating flange means, the chamber having an aperture therein to be disposed adjacent the throttle body flange means, and electrical resistance heater means accommodated in the chamber to be located between selected portions of the throttle body flange means and the mating flange means to engage the throttle body flange means through said aperture and to be energized therein for transferring heat to the throttle body flange means to avoid freeze-up of the throttle body means during furnishing of at least said air components of said air-fuel mixture to the engine.

10. Gasket means as set forth in claim 9 further characterized in that metal heat-transfer means are disposed at one side of the heater means to be disposed between the heater means and said throttle body flange means for facilitating heat-transfer from the heater means to the throttle body flange means.

11. Gasket heater means as set forth in claim 10 further characterized in that electrically conductive terminal means extend into the gasket means at an opposite side of the heater means, the electrical resistance heater means is mounted in said chamber between the terminal means and the heat-transfer means, and spring means resiliently engaged the heater means and terminal means for electrically connecting the heater means in an electrical circuit.

12. Gasket heater means as set forth in claim 11 further characterized in that the electrical resistance heater means comprises a self-regulating electrical resistance heater unit of positive temperature coefficient of resistivity having one side thereof bonded in thermally and electrically conductive relation to the metal heat-transfer means to facilitate heat-transfer to the throttle body flange means, the spring means electrically connecting an opposite side of the heater unit to the metal terminal means.

13. Gasket heater means as set for in claim 12 further characterized in that the gasket means has an aperture therein communicating with said chamber and said spring means bias the metal heat-transfer means to extend through said aperture to engage the throttle body flange means.

14. Gasket heater means as set forth in claim 13 further characterized in that the metal heat-transfer means comprises a cup-shaped metal element have a bottom, a side wall, a rim, and a flange extending outwardly from said rim, the heater unit is bonded to the bottom of the cup-shaped element inside the element, the cup-shaped element is slidable in said aperture, the spring means biases the cup-shaped element to move an outer side of the bottom of the cup-shaped element to extend through said aperture to engage the throttle body flange means, and the rim of said element is adapted to engage a portion of said gasket means for limiting extension of cup-shaped element from the aperture.

15. Gasket heater means as set forth in claim 14 further characterized in that projections are provided on the outer side of the bottom of the cup-shaped element to facilitate electrical engagement of the element with the throttle body flange means.

* * * * *